(12) United States Patent
Leonard et al.

(10) Patent No.: US 12,214,858 B2
(45) Date of Patent: Feb. 4, 2025

(54) REMOVABLE COVER FOR HATCH

(71) Applicant: Gulfstream Aerospace Corporation, Savannah, GA (US)

(72) Inventors: Patrick Leonard, Savannah, GA (US); Caleb Wright, Savannah, GA (US); Caroline Culjak, Savannah, GA (US); Matthew Sandusky, Savannah, GA (US); Omar Khan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 18/172,531

(22) Filed: Feb. 22, 2023

(65) Prior Publication Data

US 2024/0278897 A1    Aug. 22, 2024

(51) Int. Cl.
| | |
|---|---|
| *B64C 1/14* | (2006.01) |
| *B64F 5/10* | (2017.01) |
| *E02D 29/14* | (2006.01) |
| *E05C 3/00* | (2006.01) |
| *E05C 3/02* | (2006.01) |

(52) U.S. Cl.
CPC .............. *B64C 1/14* (2013.01); *B64F 5/10* (2017.01); *E02D 29/14* (2013.01); *E05C 3/004* (2013.01); *E05C 3/02* (2013.01)

(58) Field of Classification Search
CPC . B64C 1/14; B64C 1/1446; B64C 1/32; B64F 5/10; E05C 3/004; E05C 3/02; E06B 3/4654; E02D 29/14
USPC ........................................ 49/323, 465, 463
See application file for complete search history.

(56) References Cited

U.S. PATENT DOCUMENTS

| | | | | |
|---|---|---|---|---|
| 4,763,449 | A * | 8/1988 | Vigneron | E02D 29/149 220/301 |
| 5,088,435 | A * | 2/1992 | Lathers | B63B 19/18 114/178 |
| 5,617,674 | A * | 4/1997 | Terrill | E06B 9/02 49/55 |
| 10,421,546 | B2 * | 9/2019 | Dowty | B64D 11/0606 |
| 11,512,522 | B2 * | 11/2022 | Martin | E05D 15/0678 |
| 2004/0003556 | A1 * | 1/2004 | Zerbst | E05D 15/0643 52/239 |
| 2018/0023331 | A1 * | 1/2018 | Reid | E05F 15/649 49/31 |
| 2023/0145226 | A1 * | 5/2023 | Goyal | B64C 1/1461 250/227.14 |

* cited by examiner

*Primary Examiner* — Marcus Menezes
(74) *Attorney, Agent, or Firm* — Lorenz & Kopf, LLP

(57) ABSTRACT

Removable covers and methods for covering emergency exit hatches are provided. An exemplary method includes removing the emergency exit enclosure from a hatch in a wall; pushing a removable cover from an interior of the wall into the hatch; and securing the removable cover in the hatch from the interior of the wall.

14 Claims, 10 Drawing Sheets

REMOVABLE COVER FOR HATCH

TECHNICAL FIELD

Embodiments of the subject matter described herein relate generally to covers for openings or hatches of the type suitable for use in vehicles, such as aircraft. More particularly, embodiments of the subject matter relate to a removable, temporary, cover for forming a watertight seal to close a hatch.

BACKGROUND

Aviation regulations require that aircraft include emergency exits formed as hatches that are enclosed by windows and/or doors. Removal of the windows or doors can be performed from within the aircraft cabin in case of an emergency. Regulations further require that such emergency windows and doors be inspected regularly.

When inspecting or repairing an emergency exit window or door, the window or door is removed and the open hatch is typically covered to prevent precipitation or debris from entering the aircraft cabin. Specifically, a thick sheet of plastic may be positioned on the exterior skin of the aircraft and adhered to the exterior skin of the aircraft with adhesive tape. This method typically requires that a worker climb a ladder and/or onto the wing to position the sheet over the open hatch. Wind and precipitation may cause the sheet to come unadhered or to rip before the inspection or repair is completed. Further, the taped plastic sheet on the exterior of the aircraft is aesthetically displeasing.

Accordingly, it is desirable to provide removable covers and methods for covering open hatches in aircraft that address one or more of the foregoing issues. Furthermore, other desirable features and characteristics of the various embodiments described herein will become apparent from the subsequent detailed description and the appended claims, taken in conjunction with the accompanying drawings and this background.

BRIEF SUMMARY

Removable covers and methods for covering emergency exit hatches are provided. An exemplary method includes removing the emergency exit enclosure from a hatch in a wall; pushing a removable cover from an interior of the wall into the hatch; and securing the removable cover in the hatch from the interior of the wall. In exemplary embodiments, pushing the removable cover from the interior of the wall into the hatch comprises pushing an interior surface of the removable cover toward an exterior of the wall. In exemplary embodiments, adjustable tabs are located on an inner side of the wall, and securing the removable cover in the hatch comprises engaging the adjustable tabs with the removable cover.

In certain embodiments of the method, retractable tabs are located on an inner side of the wall; the removable cover has a body with an interior surface and a periphery; the interior surface of the body of the removable cover is formed with lugs located at the periphery; pushing the removable cover from the interior of the wall into the hatch comprises retracting the retractable tabs; and securing the removable cover in the hatch comprises engaging each retractable tab with a respective lug.

In certain embodiments of the method, the removable cover has a body and has a peripheral flange extending outward from the body; pushing the removable cover from the interior of the wall into the hatch comprises passing the flange through the hatch to an exterior of the wall; and securing the removable cover in the hatch comprises applying a compressive force to the wall with the peripheral flange. In certain embodiments, the removable cover has a body and has a peripheral flange extending outward from the body; pushing the removable cover from the interior of the wall into the hatch comprises passing the flange through the hatch to an exterior of the wall; the removable cover has a tightening member; and securing the removable cover in the hatch comprises adjusting the tightening member to draw the peripheral flange toward the wall. In certain embodiments, the removable cover has a body with a periphery, an exterior surface, and an interior surface; the removable cover has a peripheral flange extending outward from the body at the exterior surface; the removable cover includes tabs; pushing the removable cover from the interior of the wall into the hatch comprises passing the flange through the hatch to an exterior of the wall; and securing the removable cover in the hatch comprises extending the tabs beyond the periphery of the body and compressing the wall between the flange and the tabs. In certain embodiments of the method, the removable cover has a body with a periphery, an exterior surface, and an interior surface; the removable cover has a peripheral flange extending outward from the body at the exterior surface; the removable cover includes tabs and adjustment mechanisms: pushing the removable cover from the interior of the wall into the hatch comprises passing the flange through the hatch to an exterior of the wall; and securing the removable cover in the hatch comprises extending the tabs beyond the periphery of the body and adjusting the adjustment mechanisms to compress the wall between the flange and the tabs.

In certain embodiments of the method, the removable cover has a body with a periphery, an exterior surface, and an interior surface; the removable cover comprises a handle on the interior surface of the removable cover; and pushing the removable cover from the interior of the wall into the hatch comprises grasping the handle.

In certain embodiments, the removable cover has a body and has a peripheral flange extending outward from the body; pushing the removable cover from the interior of the wall into the hatch comprises passing the flange through the hatch to an exterior of the wall; and the method further comprises, after pushing the removable cover from the interior of the wall into the hatch, pulling the removable cover toward the wall so that the peripheral flange abuts the wall.

In another exemplary embodiment, a removable cover is provided for a hatch defined by an annular wall extending from an external surface to an internal surface, the removable cover comprising: an internal portion having a sidewall configured to fit within the annular wall of the hatch; an external portion having an external surface extending to an edge, and having an abutment surface extending from the edge to the sidewall of the internal portion; and movable tabs mounted to the internal portion and having an engagement surface; wherein: the removable cover has an installation configuration and an engaged configuration; in the installation configuration, the movable tabs and internal portion fit within the annular wall of the hatch; and in the engaged configuration, the abutment surface abuts the external surface and the engagement surfaces of the movable tabs engage the internal surface.

In exemplary embodiments, the removable cover further includes adjustment mechanisms configured to selectively decrease distances between the engagement surfaces and the abutment surface.

In exemplary embodiments, in the installation configuration, each movable tab is located over the internal portion; and wherein in the engaged configuration, each movable tab extends from the internal portion and beyond the sidewall of the internal portion.

In exemplary embodiments, the removable cover further includes an adjustment mechanism for each movable tab, wherein each movable tab is configured to rotate about a respective axis, and wherein each adjustment mechanism is configured to selectively apply a force to a respective movable tab in the direction of the respective axis.

In exemplary embodiments, the removable cover further includes an adjustment mechanism for each movable tab, wherein each movable tab is configured to rotate about a respective axis, wherein in the installation configuration, each movable tab is located over the internal portion; wherein in the engaged configuration, each movable tab extends from the internal portion and beyond the sidewall of the internal portion, and wherein each adjustment mechanism is configured to selectively apply a force to a respective movable tab in the direction of the respective axis. In such embodiments, each adjustment mechanism may be limited to application of a maximum force to prevent damage to external surface or internal surface.

In certain embodiments, the removable cover further includes a handle formed on the internal portion.

In another exemplary embodiment, a removable cover is provided for a hatch defined by an internal annular wall and a flange extending inwardly from the annular wall. The removable cover includes a body having an exterior surface, an interior surface, and a periphery configured to fit within the internal annular wall of the hatch such that a periphery of the exterior surface of the body abuts the flange; and lugs formed at the periphery of the interior surface of the body, wherein each lug has a thickness extending from the interior surface to the exterior surface, and wherein the thickness is selected to cooperate a thickness of the internal annular wall.

In exemplary embodiments, the body and lugs are monolithic. Further, in exemplary embodiments, the lugs are circumferentially spaced from one another, and wherein the interior surface is recessed between adjacent lugs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
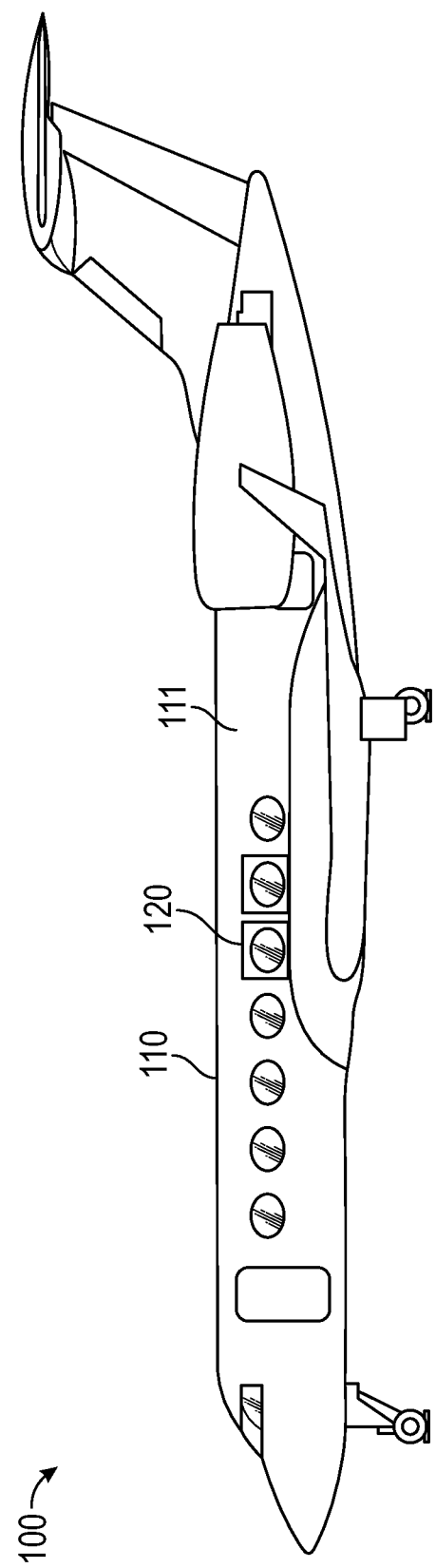
FIG. 1 is an exterior side view of an exemplary embodiment of an aircraft having an emergency exit hatch.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A light-weight, easily-installed, and removable cover is provided to cover an emergency exit hatch, such as a window or door, in a vehicle, such as an aircraft, a train, a bus, or a watercraft. However, it should be appreciated that embodiments of the disclosed removable cover can also be utilized in commercial, residential, or other applications as well. The exemplary implementation shown and described here relates to a removable cover onboard an aircraft, wherein the removable cover may be installed and engaged in an open hatch.

In accordance with certain non-limiting embodiments, the removable cover is installed from within the vehicle, i.e., from within the aircraft cabin. In certain embodiments, the aircraft fuselage may include retractable tabs or projections that secure the emergency window or door in the hatch and a handle or release for retracting the projections. In such embodiments, the same retractable tabs or projections may be used to secure the removable cover in the hatch after the emergency window or door is removed, such as for inspection or repair. In other embodiments, adjustable tabs or projections may be provided on the interior side of the removable cover. In such embodiments, the adjustable tabs may be rotated or otherwise adjusted to contact the internal surface of the fuselage to secure the cover in the hatch. In either embodiment, the cover is lightweight and may be stored in the aircraft or carried into the aircraft and installed from within the aircraft.

Referring to the drawings, FIG. 1 is a sideview of a vehicle 100, such as an aircraft. As shown, the aircraft 100 includes a wall 110 or fuselage having an exterior or outer side or surface 111. Further, the aircraft 100 includes an emergency exit enclosure 120, such as a window or door or any other removable structure for closing a hatch. In the illustrated embodiments, the emergency exit enclosure 120 is a window and is described as such hereafter. In exemplary embodiments, the emergency exit window 120 has a substantially rectangular periphery, however, in other embodiments, the periphery may be circular or oval or any other desired shape.

Figure 2:
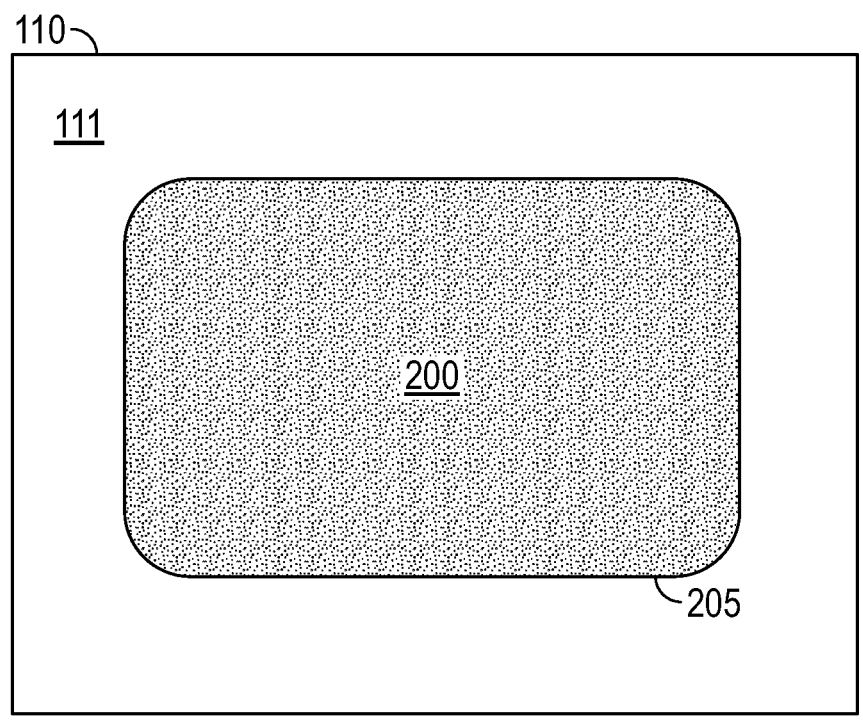
FIG. 2 is an exterior side view focused on the emergency exit hatch of the aircraft of FIG. 1, after being opened in accordance with embodiments herein.

Referring to FIG. 2, a focused view of the exterior surface 111 of the fuselage 110 is provided. As shown, the emergency exit window 120 has been removed and the hatch 200 is open. As shown, the hatch 200 is defined by an annular wall 205 that extends from the exterior surface 111 to an interior surface (not shown).

Figure 3:
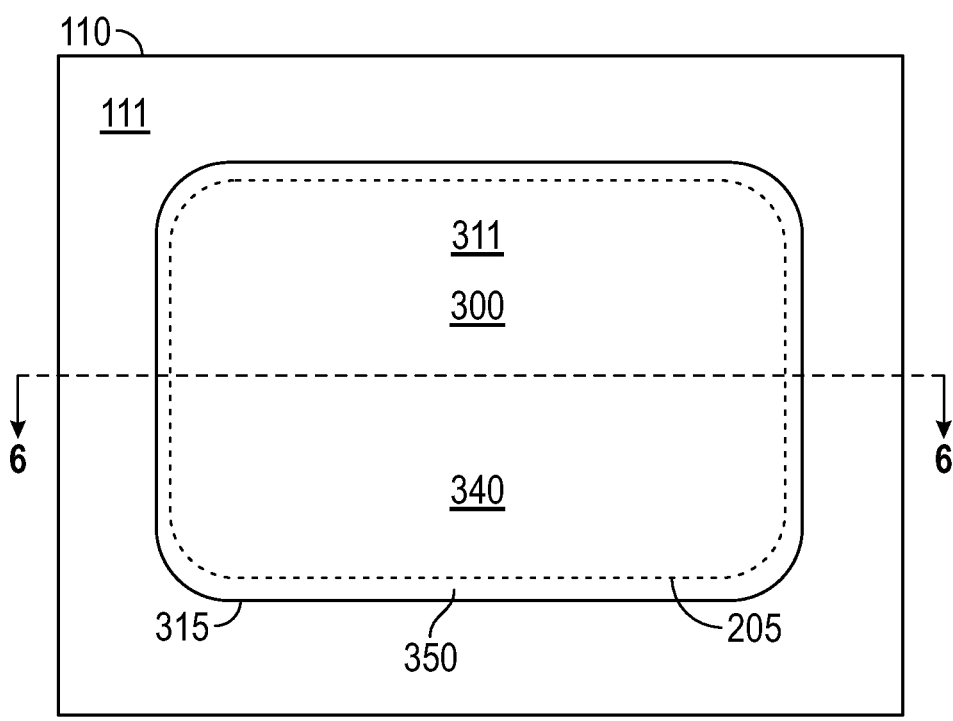
FIG. 3 is an exterior side view of the emergency exit hatch of FIG. 2, after being covered in accordance with embodiments herein.
Figure 4:
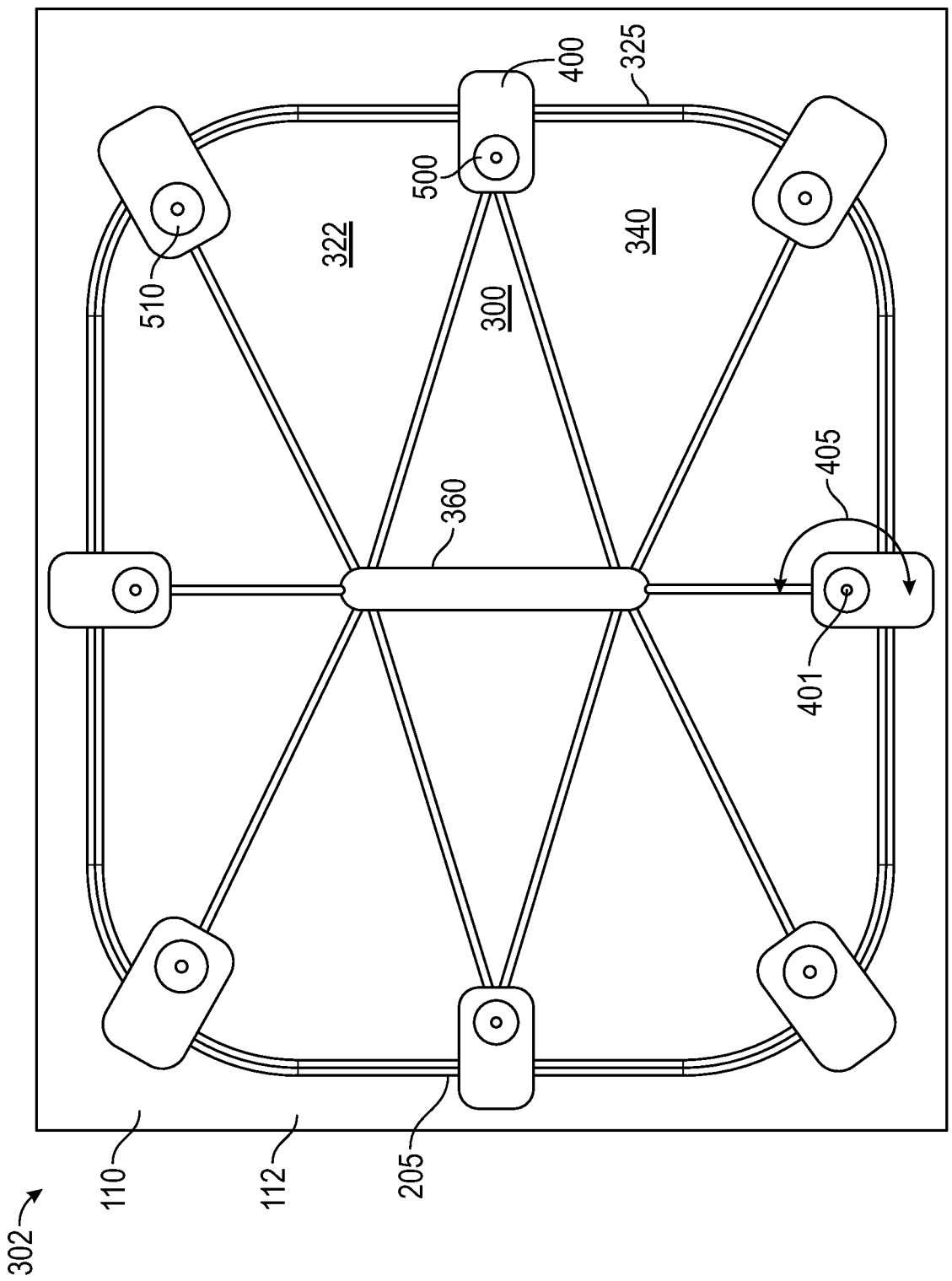
FIG. 4 is an interior side view of the emergency exit hatch of FIG. 2, after being covered in accordance with embodiments herein.

In FIG. 3, a removable cover 300 has been located in the hatch 200 to prevent precipitation or debris from entering the interior of the aircraft. As shown, the cover 300 includes a body 340 and a flange 350 that extends outward from the body 340. In FIG. 4, the annular wall 205 of the hatch 200, otherwise hidden by the cover 300, is shown in phantom to indicate that the body 340 of the cover 300 may fit within the annular wall 205 while the flange 350 extends radially outward from the body 340 to an annular edge 325. The cover 300 has an exterior surface 311 that is continuous between and defined or bound by the annular edge 315. In exemplary embodiments, the annular edge 315 of the flange 350 of the cover 300 is distanced from the annular wall 205 by one half-inch to one inch, though other dimensions may be suitable.

Referring to FIG. 4, the cover 300, as installed and engaged in the hatch 200 in an engaged configuration 302, is shown from the interior of the aircraft. As shown, the interior or inner side or surface 112 of the fuselage 110 terminates at the annular wall 205 defining the hatch. The body 340 of the cover 300 has an interior surface 322 that is continuous between and defined or bound by an annular sidewall 325 of the body 340. As shown, the annular sidewall 325 of the body 340 of the cover 300 fits within the annular wall 205 of the hatch with an allowance providing for manual installation and removal. Further, the cover 300 may include a handle 360 formed on the interior surface 322.

As shown the cover 300 further includes adjustable tabs or projections 400. The projections 400 may be adjusted to an installation configuration, not shown, in which the projections 400 are located within a footprint of the body 340, i.e., within the annular sidewall 325. After the cover 300 is located in the hatch, the projections 400 may be adjusted to an engaged configuration in which the projections 400 extend radially from the body 340 to a distance beyond the annular sidewall 325, as shown. For example, each projection 400 may be rotated about a respective axis, such as axis 401, in a desired direction, such as indicated by arrow 405, to extend from the annular sidewall 325 and engage the interior surface 112 of the fuselage 110. In an exemplary embodiment, each projection extends to a distance of from one half inch to one inch past the annular sidewall 325, though other distances are suitable.

As further shown, the cover 300 also includes tightening mechanisms 500. Specifically, each projection 400 is provided with a tightening mechanism 500 for forcing the projection 400 into contact with the interior surface 112 of the fuselage. In exemplary embodiments, the tightening mechanisms 500 comprise torque knobs, nuts, or other rotatable structures 510. In exemplary embodiments, each rotatable structure 510 is rotatable about a respective axis 401 to drive axial movement of the rotatable structure 510 in a direction perpendicular to the drawing sheet. Also, in exemplary embodiments, the tightening mechanisms 500 are limited or governed such that forces great enough to damage the fuselage 110 are not applied by driving the rotatable structure 510 toward the fuselage 110.

Figure 5:
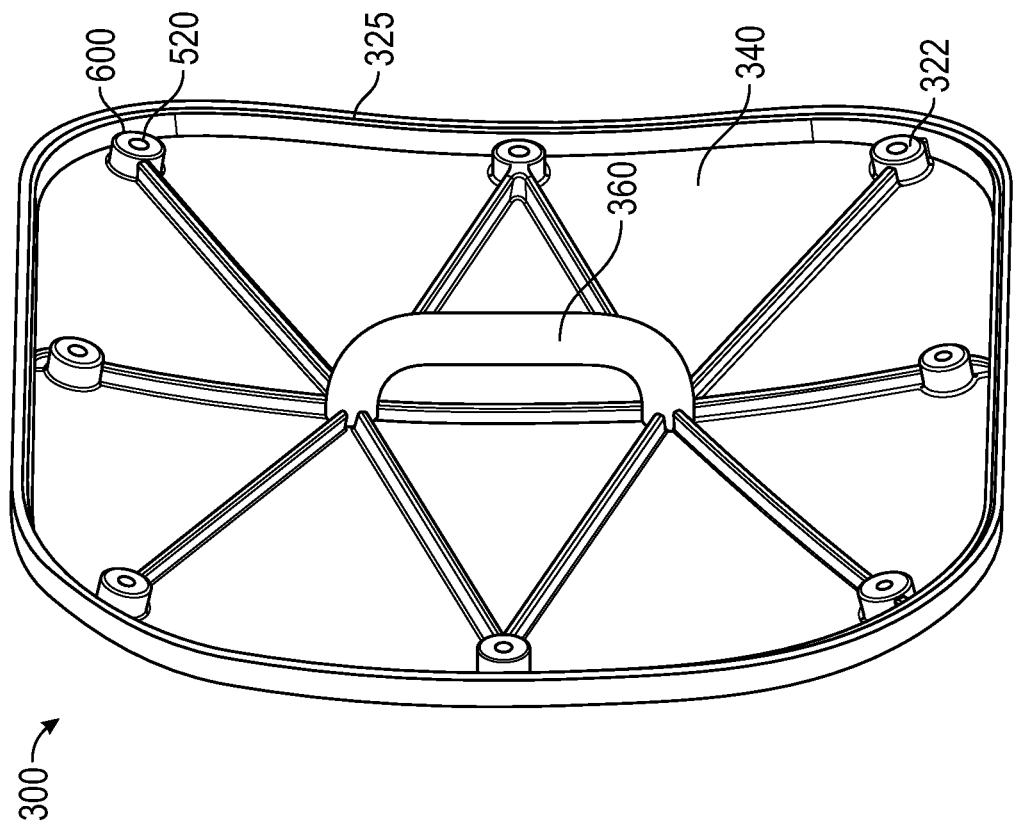
FIG. 5 is a perspective view of an emergency exit hatch cover in accordance with embodiments herein.

FIG. 5 provides a perspective view of the body 340 of the cover 300, while the flange 350 is not shown for purposes of discussion. In FIG. 5, the handle 360 is more clearly illustrated. Further, as shown, the body 340 is formed with lugs 600 or structural projections adjacent the annular wall 325. In exemplary embodiments, a distance from the exterior surface 311 (shown in FIG. 4) to the interior surface 322 defined by the lugs 600 is substantially equal to the thickness of the removed window or door. Also, each lug 600 is provided with a threaded bore 520. In exemplary embodiments, each threaded bore 520 is an insert, i.e., not molded with the body 340 of the cover. For example, the threaded bores 520 may be steel. The threaded bores 520 are provided for engagement with the rotatable structure 510 and may be considered as part of the tightening mechanism 500 of FIG. 4.

Figure 6:
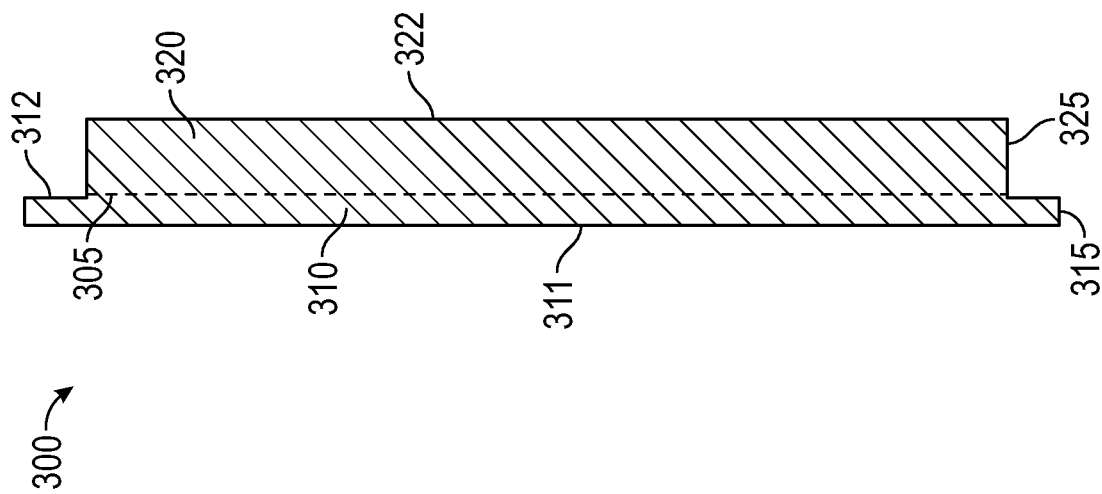
FIG. 6 is a cross-sectional schematic view of an emergency exit hatch cover in accordance with embodiments herein.

A cross-sectional view of the cover 300 is provided in FIGS. 6-10. The cross-section view is taken along line 6-6 in FIG. 3, i.e., a horizontal cross-section. A vertical cross-section would show the curve of the cover 300 indicated in FIG. 5. As shown in FIG. 6, the cover 300 may be considered to include an external portion 310 and an internal portion 320. The external portion 310 and the internal portion 320 meet at an interface 305. The use of the terms external portion 310 and internal portion 320 are not intended to indicate that the cover 300 includes two different members. Rather, in exemplary embodiments, the body 340 and the peripheral flange 350 (and the external and internal portions 310 and 320) are integral and monolithic, and may be formed by thermoplastic injection molding. The use of the terms external portion 310 and internal portion 320 refer to the location of the various parts of the cover 300 when installed in a hatch.

As shown, the external portion 310 of the cover 300 forms the exterior surface 311 that extends from opposite outer edges 315 (that form the periphery 325 of the flange 350 in FIG. 4). In FIG. 6, the outer edges 315 extend from the exterior surface 311 to an abutment surface 312. While illustrated as a planar edge, the other edges 315 may be tapered to a linear edge, rounded, or have another desired structure.

When installed in a hatch, the abutment surface 312 contacts the exterior surface 111 of the fuselage 110. Thus, the interface 305 is aligned with the exterior surface 111 of the fuselage 110, and the interior portion 320 of cover 300 is received within the fuselage 110.

As shown, the interior portion 320 of cover 300 defines the interior surface 322, which extends between and is bounded by the annular sidewall 325. The annular sidewall 325 extends from the interior surface 322 to the abutment surface 312.

Figure 7:
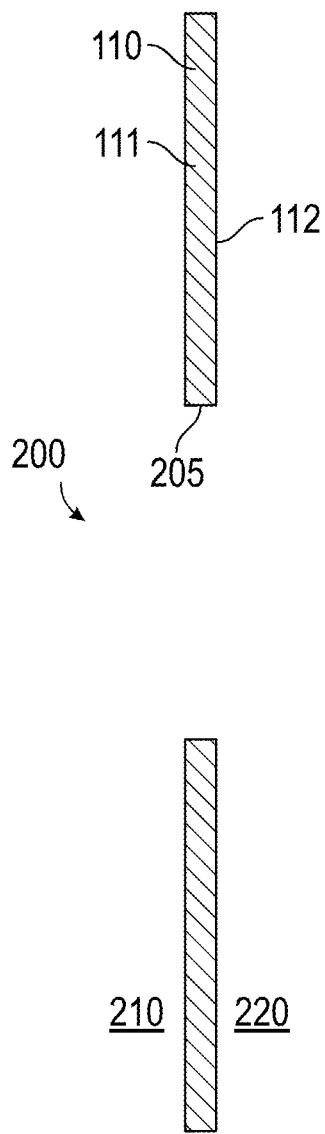
FIGS. 7-10 are cross-section schematic views illustrating a method for installing an emergency exit hatch cover in accordance with embodiments herein.

Referring now to FIGS. 7-10, a method for covering an open hatch with the removable cover 300 is illustrated. In FIG. 7, a window or door 120 (see FIG. 1) has been removed and a hatch 200 is open. As shown, the hatch 200 is bounded by an annular wall 205 of the fuselage 110 that extends from exterior surface 111 to interior surface 112. In exemplary embodiments, the annular wall 205 has a substantially linear cross-section, as shown.

Figure 8:
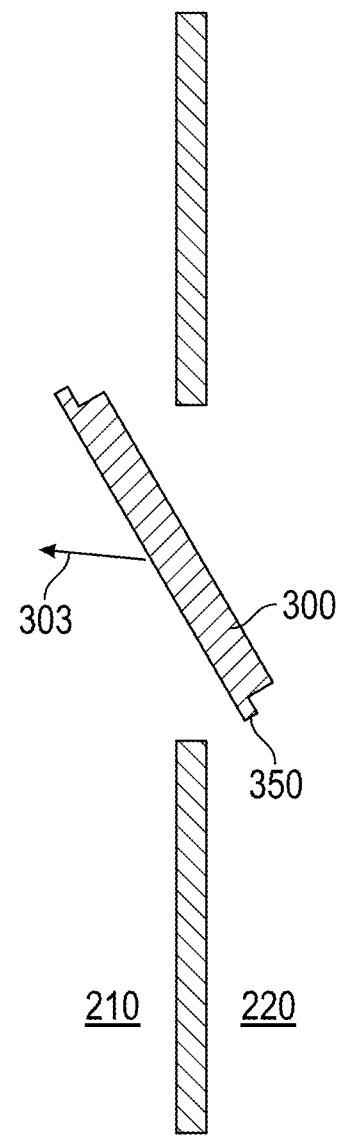

In order to cover the hatch 200, a removable cover 300 is carried from within the interior 220 or cabin of the aircraft and is passed through the hatch 200. FIG. 8 illustrates movement of the cover 300 from the interior 220 of the aircraft to the exterior 210 of the aircraft through the hatch 200 in the direction of arrow 303.

Figure 9:
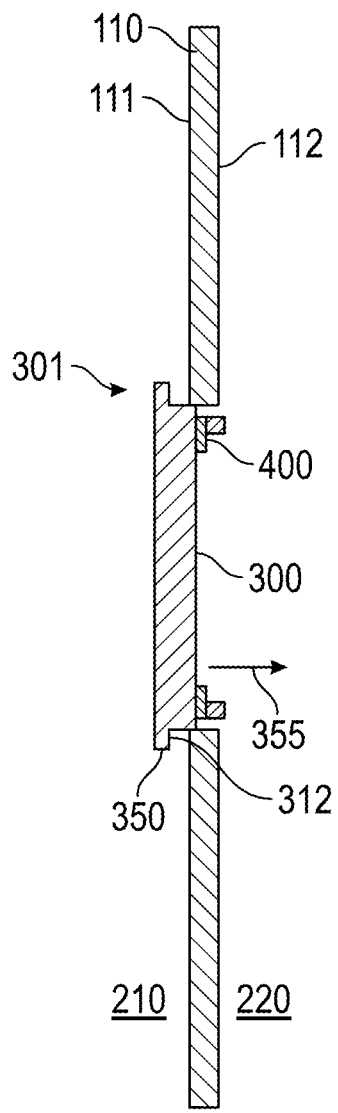

After the flange 350 has been passed through the opening 200 and is located in the exterior 210 of the aircraft, the cover 300 may be pulled back into the hatch. For example, as shown in FIG. 9, the cover 300 may be pulled in the direction of arrow 355. FIG. 9 illustrates the cover 300 in an installation configuration 301, with the projections 400 lying within the footprint of the body of the cover 300, i.e., within the annular wall 205.

Figure 10:
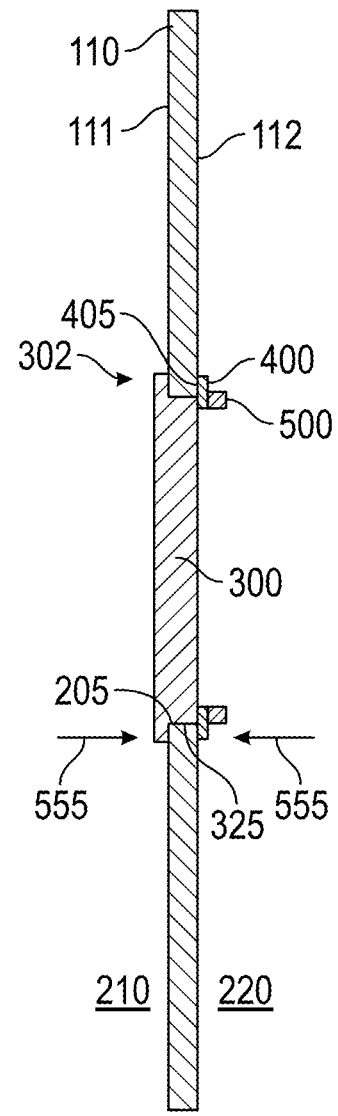

After the cover 300 has been pulled in the direction of arrow 355 such that the abutment surface 312 contacts the exterior surface 311 of the fuselage 110, the projections 400 may be adjusted to contact the interior surface 312 of the fuselage. As indicated in FIG. 10, each projection 400 has an engagement surface 405 facing the interior surface 112 of the fuselage. After adjusting the projections 400, such as by rotating the projections as indicted in FIG. 4, the tightening mechanisms 500 may be tightened to compress the fuselage 110 between the abutment surface 312 and the engagement surface 405, such as in the direction of arrows 555. As noted above, the tightening mechanism 500 may be provided with a limiter or governor that caps the compressive forces 555 applied to the surfaces 111 and 112 of the fuselage to prevent damage thereto.

FIGS. 3-10 illustrate an embodiment in which the cover 300 is provided with opposite surfaces 312 and 405 that may be drawn toward one another, such as by tightening the projections 400 with mechanisms 500 to hold the cover 300 in the engaged configuration 302 of FIG. 10. Other embodiments are contemplated.

Figure 11:
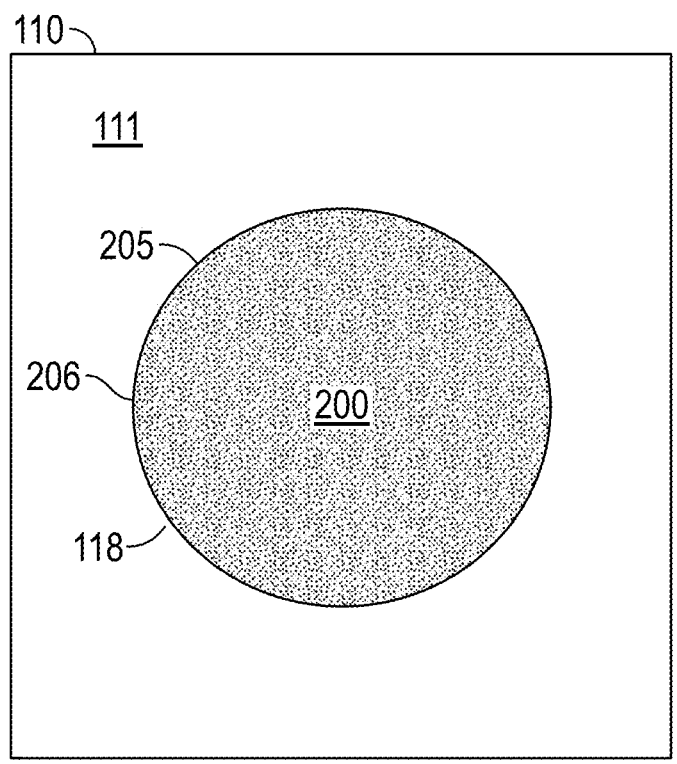
FIG. 11 is an exterior side view focused on the emergency exit hatch of the aircraft of FIG. 1, after being opened in accordance with embodiments herein.

In FIG. 11, a focused view of another embodiment of the exterior surface 111 of a fuselage 110 is provided. As shown, the emergency exit window 120 has been removed and the hatch 200 is open. As shown, the hatch 200 is defined by an annular wall 205 that extends from the exterior surface 111 to an interior surface (not shown).

Figure 12:
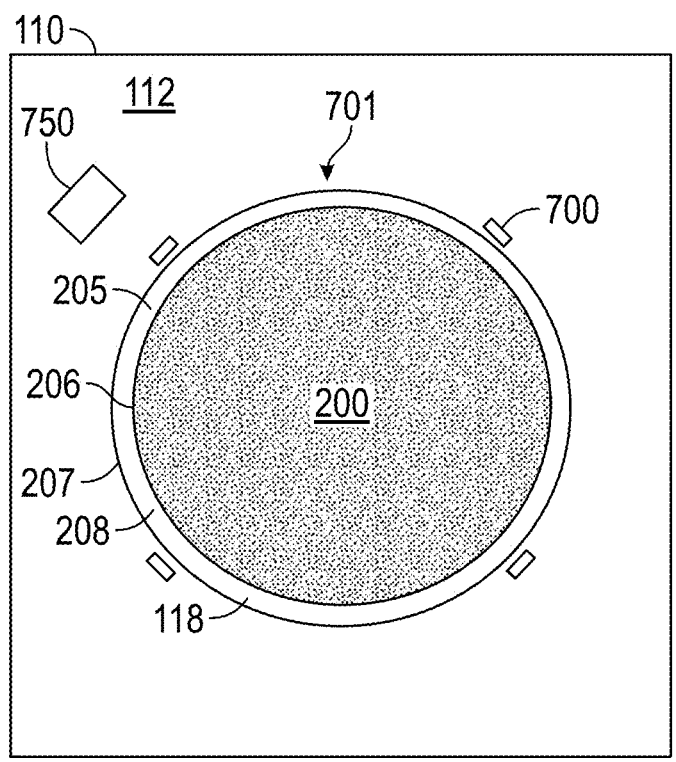
FIG. 12 is an interior side view of the emergency exit hatch of FIG. 12, after being opened in accordance with embodiments herein.

FIG. 12 provides a view from the interior of the aircraft. As shown, the hatch 200 is open. The annular wall 205 extends to the interior surface 112 of the fuselage 110. As shown, the annular wall 205 does not have a linear cross section. Rather, the annular wall defines an outer rim 206 having a relative smaller diameter and an inner rim 207 having a relatively larger diameter. Thus, the fuselage 110 includes a lip 118 with an inward-facing surface 208 that extends from the outer rim 206 to the inner rim 207. In exemplary embodiments, the outer rim 206 is distanced from the inner rim 207 by one half-inch to one inch, though other dimensions may be suitable.

As further shown, the fuselage 110 may be provided with adjustable tabs or projections 700. In FIG. 12, the projections 700 are in a retracted configuration 701. Also, the fuselage 110 may be provided with a trigger 750 or release that is mechanically connected to the projections 700 to actuate movement to the retracted configuration 701 from an extended configuration and from the retracted configuration 701 to the extended configuration.

Figure 13:
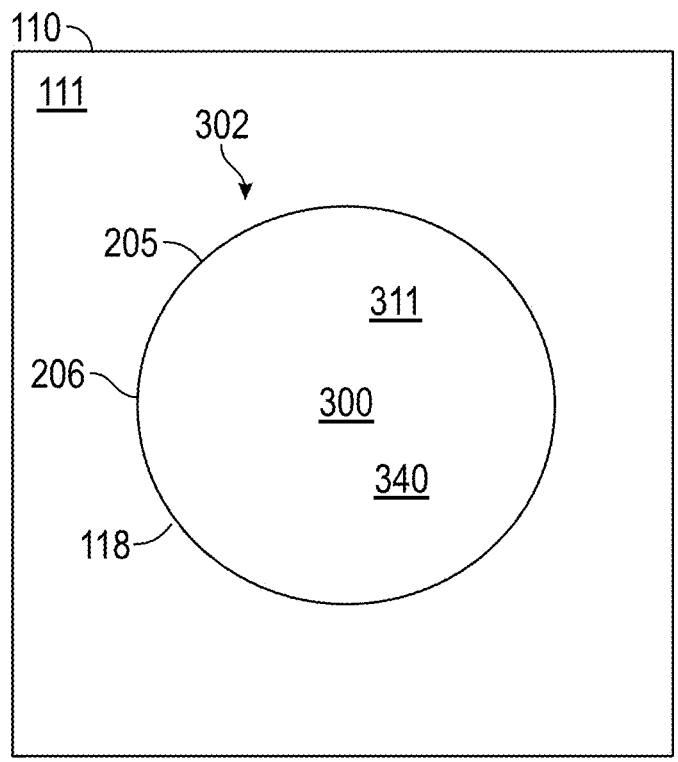
FIG. 13 is an exterior side view focused on the emergency exit hatch of the aircraft of FIG. 11, after being covered in accordance with embodiments herein.

In FIG. 13, a removable cover 300 has been located in the hatch 200 to prevent precipitation or debris from entering the interior of the aircraft. Specifically, FIG. 13 provides a view of the cover 300 in the engaged configuration 302 from the exterior of the aircraft. As shown from the exterior of the aircraft, the cover 300 includes a body 340 that sits inside the lip 118 of the annular wall 205. The body 340 includes an exterior surface 311 that extends to and terminates at an annular wall, which is hidden by the lip 118 of the of the annular wall 205.

Figure 14:
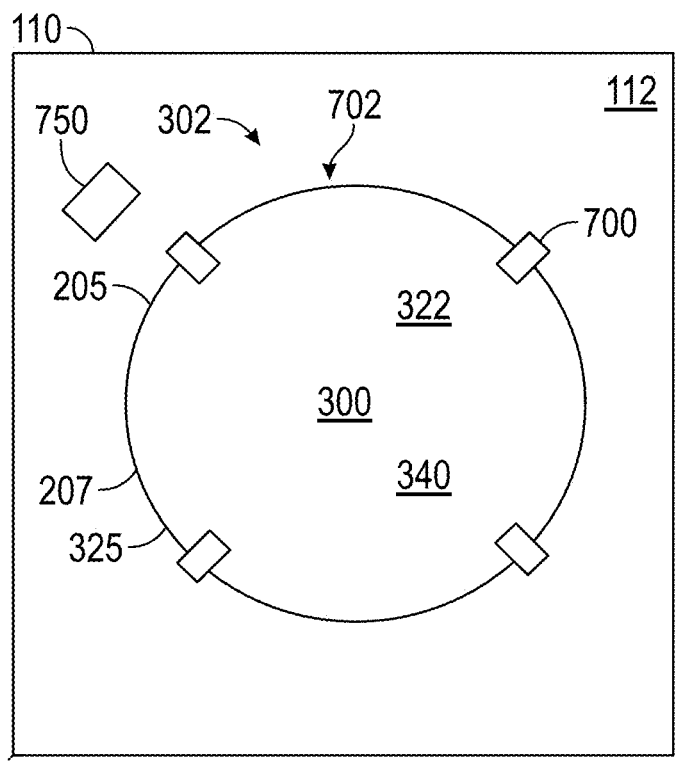
FIG. 14 is an interior side view of the emergency exit hatch of FIG. 12, after being covered in accordance with embodiments herein.

Referring to FIG. 14, a view of the cover 300 in the engaged configuration 302 is illustrated from the interior of the aircraft. As shown, the cover 300 includes a body 340 and an interior surface 322 that extends to and terminates at an annular wall or periphery 325. The body 340 has a diameter greater than the diameter of the outer rim 206 (shown in FIG. 13) and less than the diameter of the inner rim 207. Thus, cover 300 may be received within the annular wall 205 of the fuselage 110 and abut against the lip 208 (shown in FIG. 12).

As shown in FIG. 14, the projections 700 have been extended to an extended configuration 702, in which the projections 700 extend from the fuselage 110 and over the annular wall 205 to engage the interior surface 322 of the cover 300. As indicated above, the trigger 750 may be manipulated to selectively cause extension and retraction of the projections 700.

Figure 15:
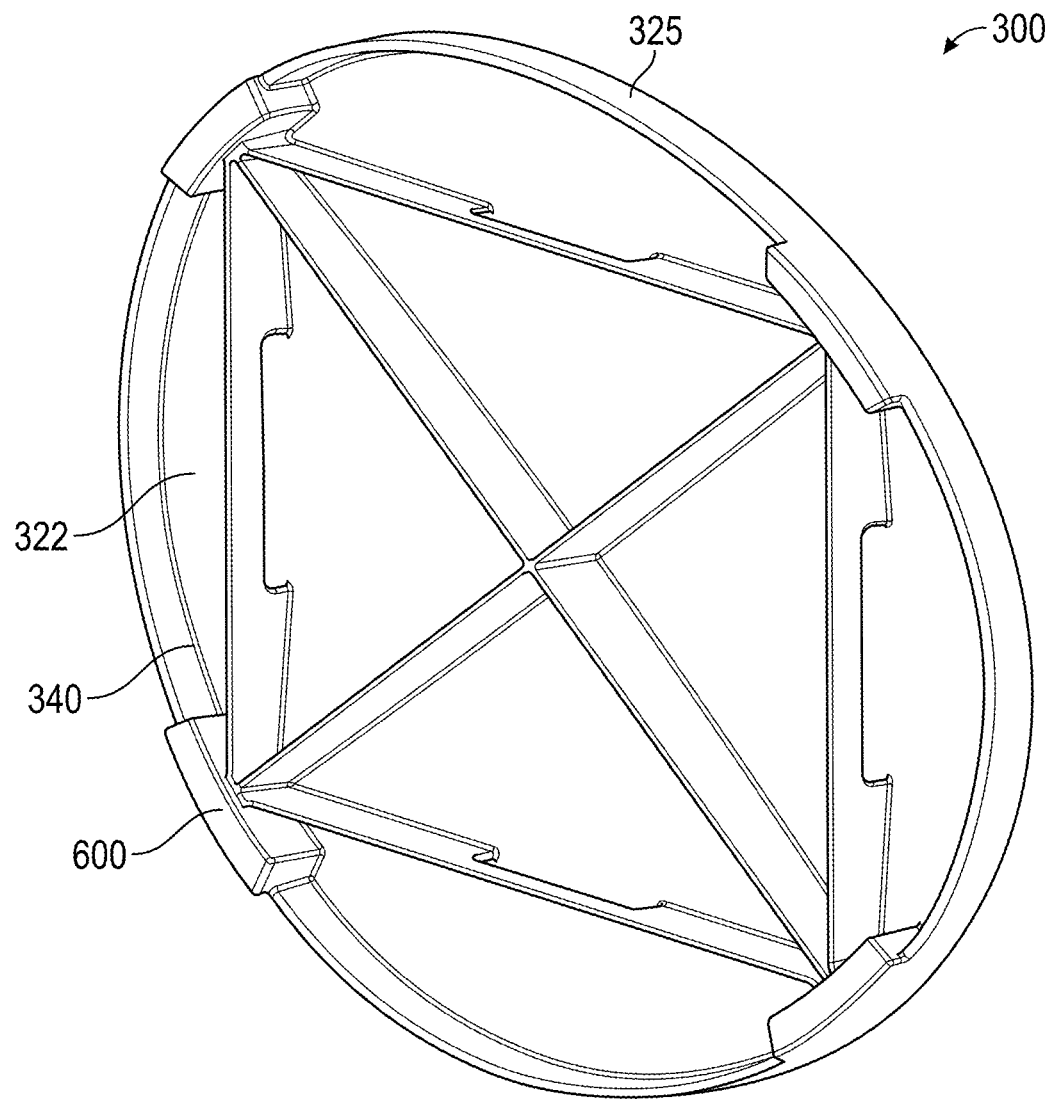
FIG. 15 is a perspective view of an emergency exit hatch cover in accordance with embodiments herein.

FIG. 15 is a perspective view of an exemplary cover 300. As shown, the interior surface 322 of the body 340 of the cover 300 includes lugs 600 spaced about the periphery 325. The lugs 600 provide the cover 300 with sufficient structural strength and an appropriate thickness for engagement with the projections 700 as described below.

Figure 16:
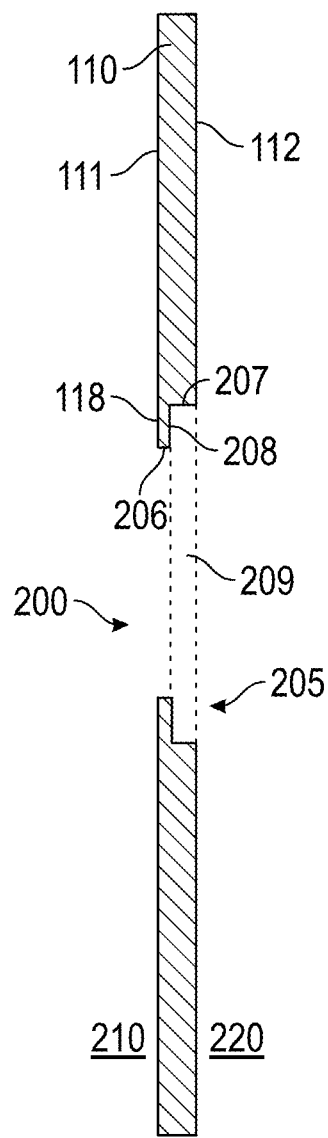
FIGS. 16-18 are cross-section schematic views, similar to the views of FIGS. 6-10, illustrating a method for installing an emergency exit hatch cover in accordance with embodiments herein.
Figure 17:
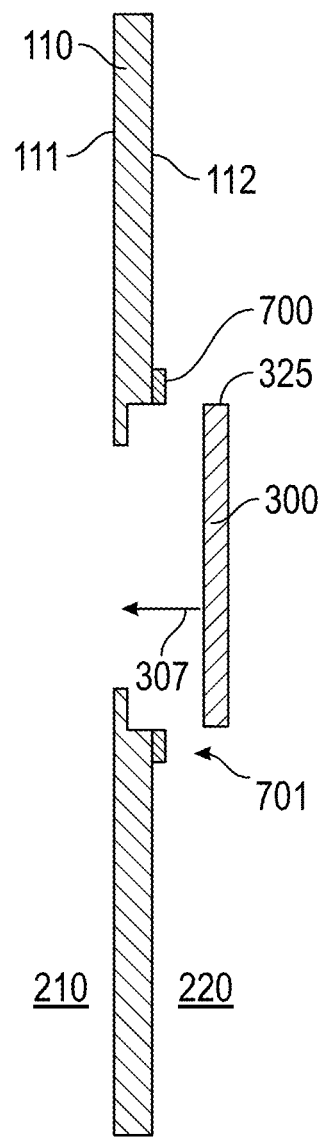
Figure 18:
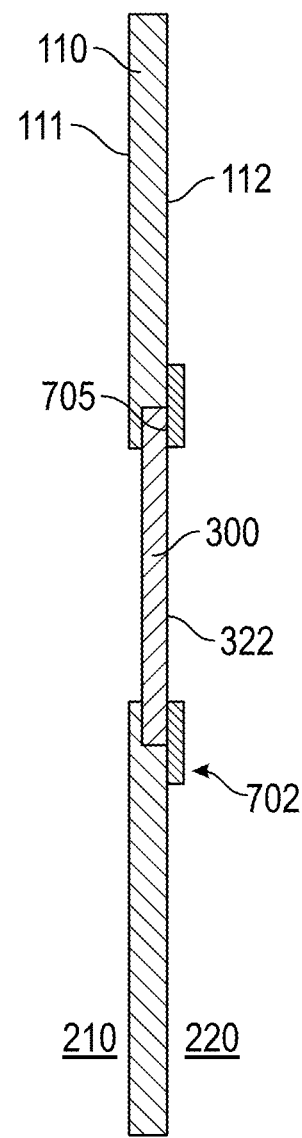

Referring now to FIGS. 16-18, a method for covering an open hatch with the removable cover 300 is illustrated. In FIG. 16, a window or door 120 (see FIG. 1) has been removed and a hatch 200 is open. As shown, the hatch 200 is bounded by an annular wall 205 of the fuselage 110 that extends from exterior surface 111 to interior surface 112. In exemplary embodiments, the annular wall 205 includes an annular outer rim 206, an inner rim 207, and an inward-facing surface 208 interconnecting the rims 206 and 207. Further, the hatch 200 defines a pocket 209 within the inner rim 207 and bounded by the inward-facing surface 208.

In order to cover the hatch 200, a removable cover 300 is carried from within the interior 220 or cabin of the aircraft and is pushed into the pocket 208, such as in the direction of arrow 307 shown in FIG. 17. In embodiments of FIGS. 11-18, the cover 300 does not pass through the hatch 200 to the exterior 210 of the aircraft. As shown in FIG. 17, the projections 700 are in a retracted configuration 701 while the cover 300 is pushed into contact with the inward-facing surface 208 of the lip 208.

As further shown FIG. 18, after the cover 300 is pushed into contact with the inward-facing surface 208 of the lip 208, the trigger (shown in FIG. 14) is manipulated to extend the projections 700 to an extended configuration 702, in which the projections extend from the interior surface 112 of the fuselage 110 over the periphery 325 of the cover 300. As a result, engagement surfaces 705 of the projections 700 engage the interior surface 322 of the cover and hold the cover in the pocket 209. In exemplary embodiments, the thickness of the cover 300 between the engagement surfaces 705 of the projections 700 and the inward-facing surface 208 of the lip 118 is substantially equal to the thickness of the removed window or door. As a result, the force applied by the projections 700 is appropriate to hold the cover 300 in the pocket 209. For example, the cover 300 may be aligned with the hatch 200 such that the engagement surfaces 705 of the projections 700 contact the lugs 700 shown in FIG. 15.

In exemplary embodiments, the removable cover 300 is typically installed on aircraft for a period of time of from a day to several weeks. In exemplary embodiments, the aircraft is provided with four emergency exits, two on each side of the aircraft, and four removable covers are provided for the aircraft.

In exemplary embodiments, the cover 300 is held onto the fuselage with sufficient force to make a watertight seal between the fuselage and the cover, but with less force than is necessary to damage the aircraft skin, i.e., the outer surface of the fuselage. As described, the removable cover 300 may be carried by one person, lifted into the open hatch, and connected to the fuselage by hand, i.e., without the use of tools. In exemplary embodiments, the cover weighs less than 20 lbs., such as from 6 to 8, from 8 to 10, to 10 to 12, or from 12 to 14 lbs. The removable cover may be stowed in a baggage compartment of the aircraft or may be stored in a hangar or other aircraft facility.

In exemplary embodiments, all components of the cover 300 are monolithic. In exemplary embodiments, the cover is formed by plastic injection molding. In other embodiments, the body and flange of the cover 300 are monolithic, and the projections 400 and tightening mechanism 500 (including threaded sleeve and rotatable knob) may be connected to the cover 300, such as by a lanyard, so that no components are separated and lost.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for removing an emergency exit enclosure, the method comprising:
removing the emergency exit enclosure from a hatch in a wall;
providing a removable cover having a body and a peripheral flange extending outward from the body;
pushing the removable cover from an interior of the wall into the hatch by passing the peripheral flange through the hatch to an exterior of the wall; and
securing the removable cover in the hatch from the interior of the wall by applying a compressive force to the wall with the peripheral flange, wherein:
the wall is a fuselage wall that encloses a cabin of an aircraft;
the emergency exit enclosure comprises a window and/or a door;
the removable cover comprises an external portion and an internal portion;
the external portion and internal portion are integral;
the external portion includes a planar exterior surface extending from opposite annular edges forming the peripheral flange, the annular edges extending from the exterior surface at the peripheral flange to an abutment surface contacting the wall; and
the internal portion includes an annular sidewall extending from the abutment surface to an internal surface.

2. The method of claim 1, wherein pushing the removable cover from the interior of the wall into the hatch comprises pushing an interior surface of the removable cover toward the exterior of the wall.

3. The method of claim 1, wherein adjustable tabs are located on an inner side of the wall, and wherein securing the removable cover in the hatch comprises engaging the adjustable tabs with the removable cover.

4. The method of claim 1, wherein:
retractable tabs are located on an inner side of the wall;
the body of the removable cover has an interior surface and a periphery;
the interior surface of the body of the removable cover is formed with lugs located at the periphery;
pushing the removable cover from the interior of the wall into the hatch comprises retracting the retractable tabs; and
securing the removable cover in the hatch comprises engaging each retractable tab with a respective lug.

5. The method of claim 1, wherein:
the removable cover has a tightening member; and
securing the removable cover in the hatch comprises adjusting the tightening member to draw the peripheral flange toward the wall.

6. The method of claim 1, wherein:
the body of the removable cover has a periphery, an exterior surface, and an interior surface;
the removable cover includes tabs; and
securing the removable cover in the hatch comprises extending the tabs beyond the periphery of the body and compressing the wall between the peripheral flange and the tabs.

7. The method of claim 1, wherein:
the body of the removable cover has a periphery, an exterior surface, and an interior surface;
the removable cover includes tabs and adjustment mechanisms; and
securing the removable cover in the hatch comprises extending the tabs beyond the periphery of the body and adjusting the adjustment mechanisms to compress the wall between the peripheral flange and the tabs.

8. The method of claim 1, wherein:

the body of the removable cover has a periphery, an exterior surface, and an interior surface;

the removable cover comprises a handle on the interior surface of the removable cover; and pushing the removable cover from the interior of the wall into the hatch comprises grasping the handle.

9. The method of claim 1, wherein securing the removable cover in the hatch comprises pulling the removable cover toward the wall so that the peripheral flange abuts the wall.

10. The method of claim 1, wherein a handle is formed on the internal surface, and wherein securing the removable cover in the hatch from the interior of the wall by applying the compressive force to the wall with the peripheral flange comprises pulling on the handle.

11. The method of claim 10, wherein rotatable projections are mounted to the internal surface adjacent to the annular sidewall, and wherein the method further comprises:

before pushing the removable cover from an interior of the wall into the hatch, positioning the rotatable projections toward the inner portion such that the rotatable projections do not extend outward from the annular sidewall; and while securing the removable cover in the hatch, rotating the rotatable projections to extend outward from the annular sidewall to engage the fuselage wall between the rotatable projections and the peripheral flange.

12. The method of claim 11, wherein each rotating projection is connected to the internal portion by an adjustment mechanism, wherein each rotatable tab is configured to rotate about a respective axis, and wherein each adjustment mechanism is configured to selectively apply a force to a respective rotatable tab in a direction of the respective axis.

13. The method of claim 12, further comprising tightening the rotatable projections to compress the fuselage wall between the abutment surface and the rotatable projections.

14. The method of claim 13, further comprising limiting application of a maximum force applied to the fuselage wall while tightening the rotatable projections to prevent damage to the fuselage wall.

* * * * *